(12) United States Patent
Rathore

(10) Patent No.: US 9,957,358 B2
(45) Date of Patent: May 1, 2018

(54) CURABLE POLYMERS COMPRISING SILSESQUIOXANE POLYMER CORE SILSESQUIOXANE POLYMER OUTER LAYER, AND REACTIVE GROUPS

(71) Applicant: 3M INNOVATIVE PROPERTIES COMPANY, St. Paul, MN (US)

(72) Inventor: Jitendra Rathore, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days. days.

(21) Appl. No.: 15/508,518

(22) PCT Filed: Sep. 16, 2015

(86) PCT No.: PCT/US2015/050334
§ 371 (c)(1),
(2) Date: Mar. 3, 2017

(87) PCT Pub. No.: WO2016/048736
PCT Pub. Date: Mar. 31, 2016

(65) Prior Publication Data
US 2017/0275426 A1 Sep. 28, 2017

Related U.S. Application Data

(60) Provisional application No. 62/053,326, filed on Sep. 22, 2014.

(51) Int. Cl.
*C08G 77/28* (2006.01)
*C08G 77/18* (2006.01)
(Continued)

(52) U.S. Cl.
CPC ........... *C08G 77/28* (2013.01); *C08G 75/045* (2013.01); *C08G 75/12* (2013.01); *C08G 77/18* (2013.01); *C09D 181/02* (2013.01)

(58) Field of Classification Search
None
See application file for complete search history.

(56) References Cited

U.S. PATENT DOCUMENTS 3,755,452 A 11/1973 Scotia
4,351,875 A 9/1982 Arkens
(Continued)

FOREIGN PATENT DOCUMENTS

CN 1827668 9/2006
CN 1887921 1/2007
(Continued)

OTHER PUBLICATIONS

Fluka Chemika "Silylating Agents Derivatization Reagents Protecting-Group Reagents Organosilicon Compounds Analytical Applications Synthetic Applications" 45 pages (Year: 1995).*
(Continued)

*Primary Examiner* — Robert S Loewe
(74) *Attorney, Agent, or Firm* — Carolyn A. Fischer

(57) ABSTRACT

Curable silsesquioxane polymers are described comprising a core comprising a first silsesquioxane polymer and an outer layer comprising a second silsesquioxane polymer bonded to the core. The silsesquioxane polymer of the core, outer layer, or combination thereof comprises reactive groups that are not ethylenically unsaturated groups. The first silsesquioxane polymer of the core is bonded to the second silsesquioxane polymer of the outer layer via silicon atoms bonded to three oxygen atoms. In some embodiments, the outer layer has a higher concentration of reactive groups than the core. In this embodiment, the core may be substantially free of reactive groups. In other embodiments, the core has a higher concentration of reactive groups than the core. In this embodiment, the outer layer may be substantially free of reactive groups. The core and outer layer each comprise a three-dimensional branched network of a different silsesquioxane polymer. The silsesquioxane polymers of the core and outer layer may be homopolymers or copolymers. Also described are methods of preparing curable silsesquioxane
(Continued)

polymer comprising a core and outer layer bonded to the core, articles comprising curable or cured compositions comprising the silsesquioxane core/outer layer polymers, and methods of curing.

21 Claims, 2 Drawing Sheets

(51) Int. Cl.
  *C08G 75/12* (2016.01)
  *C08G 75/045* (2016.01)
  *C09D 181/02* (2006.01)

(56) References Cited

U.S. PATENT DOCUMENTS

| | | | |
|---|---|---|---|
| 4,415,615 A | 11/1983 | Esmay | |
| 4,510,094 A | 4/1985 | Drahnak | |
| 4,530,879 A | 7/1985 | Drahnak | |
| 4,535,485 A | 8/1985 | Ashman | |
| 4,600,484 A | 7/1986 | Drahnak | |
| 4,723,978 A | 2/1988 | Clodgo | |
| 4,732,034 A | 3/1988 | Hathaway | |
| 4,761,358 A | 8/1988 | Hosoi | |
| 4,788,252 A | 11/1988 | De Boer | |
| 4,871,616 A * | 10/1989 | Kimura | C08J 3/2053 427/222 |
| 4,879,362 A | 11/1989 | Morgan | |
| 4,885,209 A | 12/1989 | Lindner | |
| 4,889,901 A | 12/1989 | Shama | |
| 4,948,837 A | 8/1990 | Wittmann | |
| 4,963,619 A | 10/1990 | Wittmann | |
| 4,997,260 A | 3/1991 | Honjo | |
| 5,030,699 A | 7/1991 | Motoyama | |
| 5,057,577 A | 10/1991 | Matsuo | |
| 5,073,595 A | 12/1991 | Almer | |
| 5,145,886 A | 9/1992 | Oxman | |
| 5,149,748 A * | 9/1992 | Shimizu | C08G 77/06 427/212 |
| 5,178,947 A | 1/1993 | Charmot | |
| 5,188,899 A | 2/1993 | Matsumoto | |
| 5,212,237 A | 3/1993 | Siol | |
| 5,219,931 A | 6/1993 | Siol | |
| 5,223,586 A | 6/1993 | Mautner | |
| 5,278,451 A | 1/1994 | Adachi | |
| 5,360,878 A | 11/1994 | Shen | |
| 5,491,203 A | 2/1996 | Matsui | |
| 5,506,279 A | 4/1996 | Babu | |
| 5,602,221 A | 2/1997 | Bennett | |
| 5,609,925 A | 3/1997 | Camilletti | |
| 5,695,678 A | 12/1997 | Edamura | |
| 5,738,976 A | 4/1998 | Okinoshima | |
| 5,773,485 A | 6/1998 | Bennett | |
| 5,902,836 A | 5/1999 | Bennett | |
| 6,376,078 B1 * | 4/2002 | Inokuchi | C08J 3/12 427/212 |
| 6,624,214 B2 | 9/2003 | Zimmer | |
| 6,627,314 B2 | 9/2003 | Matyjaszewski | |
| 6,743,510 B2 | 6/2004 | Ochiai | |
| 6,852,781 B2 | 2/2005 | Savu | |
| 6,927,301 B2 | 8/2005 | Laine | |
| 7,022,799 B2 | 4/2006 | Dai | |
| 7,056,840 B2 | 6/2006 | Miller | |
| 7,081,295 B2 | 7/2006 | James | |
| 7,241,437 B2 | 7/2007 | Davidson | |
| 7,385,020 B2 | 6/2008 | Anderson | |
| 7,457,507 B2 | 11/2008 | Kuramoto | |
| 7,488,539 B2 | 2/2009 | Kozakai | |
| 7,569,619 B2 | 8/2009 | Esaki | |
| 7,734,438 B2 | 5/2010 | Hedrick | |
| 7,939,617 B2 * | 5/2011 | Ootake | C08G 77/14 528/34 |
| 7,976,585 B2 | 7/2011 | Cremer | |
| 7,985,523 B2 | 7/2011 | Zhou | |
| 8,012,583 B2 | 9/2011 | Wu | |
| 8,063,237 B2 | 11/2011 | Biteau | |
| 8,071,132 B2 | 12/2011 | Adair | |
| 8,084,177 B2 | 12/2011 | Zhou | |
| 8,097,683 B2 * | 1/2012 | Keller | C08F 283/00 525/326.5 |
| 8,168,357 B2 | 5/2012 | Wu | |
| 8,173,342 B2 | 5/2012 | Wu | |
| 8,208,359 B2 * | 6/2012 | Aikoh | C08G 77/045 369/112.01 |
| 8,323,803 B2 | 12/2012 | Wu | |
| 8,329,301 B2 | 12/2012 | Wu | |
| 8,431,220 B2 | 4/2013 | Wu | |
| 8,748,552 B2 * | 6/2014 | Kim | C08G 77/06 528/14 |
| 8,758,854 B2 | 6/2014 | Ishii | |
| 8,916,645 B2 * | 12/2014 | Hu | C08G 77/04 524/588 |
| 2003/0234458 A1 | 12/2003 | Gardner | |
| 2004/0026316 A1 * | 2/2004 | Ebenhoch | C08G 77/32 210/600 |
| 2004/0166077 A1 | 8/2004 | Toumi | |
| 2004/0247549 A1 | 12/2004 | Lu | |
| 2005/0025820 A1 | 2/2005 | Kester | |
| 2005/0106400 A1 | 5/2005 | Kuramoto | |
| 2005/0215807 A1 | 9/2005 | Morimoto | |
| 2005/0256330 A1 | 11/2005 | Okawa | |
| 2006/0147177 A1 | 7/2006 | Jing | |
| 2007/0073024 A1 | 3/2007 | Wariishi | |
| 2007/0134424 A1 | 6/2007 | Tauchi | |
| 2007/0167552 A1 | 7/2007 | Stoeppelmann | |
| 2007/0213474 A1 | 9/2007 | Ebenhoch | |
| 2008/0045631 A1 | 2/2008 | Henn | |
| 2008/0057431 A1 | 3/2008 | Lai | |
| 2008/0090986 A1 | 4/2008 | Khanarian | |
| 2008/0119120 A1 | 5/2008 | Zuniga | |
| 2008/0254077 A1 | 10/2008 | Prigent | |
| 2008/0279901 A1 | 11/2008 | Prigent | |
| 2008/0286467 A1 | 11/2008 | Allen | |
| 2009/0162650 A1 | 6/2009 | Hong | |
| 2009/0165913 A1 * | 7/2009 | Hergenrother | C08G 77/26 152/451 |
| 2009/0197071 A1 | 8/2009 | Cramail | |
| 2009/0215927 A1 | 8/2009 | Mohite | |
| 2009/0312457 A1 | 12/2009 | Tokumitsu | |
| 2010/0280151 A1 | 11/2010 | Nguyen | |
| 2011/0045387 A1 | 2/2011 | Allen | |
| 2011/0054074 A1 | 3/2011 | Jonschker | |
| 2011/0062619 A1 * | 3/2011 | Laine | B82Y 10/00 264/134 |
| 2011/0083887 A1 | 4/2011 | Brock | |
| 2011/0117145 A1 | 5/2011 | Inokuchi | |
| 2011/0223404 A1 | 9/2011 | Wu | |
| 2012/0132108 A1 | 5/2012 | Ishihara | |
| 2012/0205315 A1 | 8/2012 | Liu | |
| 2012/0288692 A1 | 11/2012 | Broyles | |
| 2012/0298574 A1 | 11/2012 | Kang | |
| 2013/0101934 A1 | 4/2013 | Chiba | |
| 2013/0102733 A1 | 4/2013 | Chen | |
| 2013/0139963 A1 | 6/2013 | Lee | |
| 2013/0158140 A1 * | 6/2013 | Lin | C09D 5/006 521/54 |
| 2013/0221400 A1 | 8/2013 | Tanikawa | |
| 2013/0318863 A1 | 12/2013 | Chang | |
| 2013/0343969 A1 | 12/2013 | Bromberg | |
| 2014/0023855 A1 | 1/2014 | Masuda | |
| 2014/0030441 A1 | 1/2014 | Nagai | |
| 2014/0135413 A1 | 5/2014 | Yoo | |
| 2014/0178698 A1 | 6/2014 | Rathore | |
| 2014/0342165 A1 | 11/2014 | Bruce | |

FOREIGN PATENT DOCUMENTS

| | | |
|---|---|---|
| CN | 101376812 | 3/2009 |
| CN | 101550217 | 10/2009 |
| CN | 101717565 | 6/2010 |
| CN | 101724394 | 6/2010 |
| CN | 101781390 | 7/2010 |

(56) References Cited

FOREIGN PATENT DOCUMENTS

| | | |
|---|---|---|
| CN | 102432920 | 5/2012 |
| CN | 102532554 | 7/2012 |
| CN | 102585073 | 7/2012 |
| CN | 102718930 | 10/2012 |
| CN | 103012689 | 4/2013 |
| CN | 103030752 | 4/2013 |
| CN | 103113812 | 5/2013 |
| CN | 103173041 | 6/2013 |
| CN | 103275273 | 9/2013 |
| CN | 103289021 | 9/2013 |
| EP | 0254418 | 1/1988 |
| EP | 0315226 | 5/1989 |
| EP | 0373941 | 6/1990 |
| EP | 0398701 | 11/1990 |
| EP | 0420155 | 4/1991 |
| EP | 0420585 | 4/1991 |
| EP | 0459257 | 12/1991 |
| EP | 0556953 | 8/1993 |
| EP | 0958805 | 11/1999 |
| EP | 1086974 | 3/2001 |
| EP | 2155761 | 2/2010 |
| EP | 2677005 | 12/2013 |
| JP | S55-111148 | 8/1980 |
| JP | S62-124159 | 6/1987 |
| JP | S62-130807 | 6/1987 |
| JP | S62-255957 | 11/1987 |
| JP | S63-291962 | 11/1988 |
| JP | 2541566 | 1/1989 |
| JP | H01-096265 | 4/1989 |
| JP | S64-90201 | 4/1989 |
| JP | H01-195458 | 8/1989 |
| JP | H02-233537 | 9/1990 |
| JP | H03-002808 | 1/1991 |
| JP | H03-154007 | 7/1991 |
| JP | H04-050243 | 2/1992 |
| JP | H04-110351 | 4/1992 |
| JP | H04-173863 | 6/1992 |
| JP | H04-175370 | 6/1992 |
| JP | H04-178411 | 6/1992 |
| JP | H05-271362 | 10/1993 |
| JP | H08-134308 | 5/1996 |
| JP | H11-060931 | 3/1999 |
| JP | 11116681 | 4/1999 |
| JP | H11-116681 | 4/1999 |
| JP | 2000-063674 | 2/2000 |
| JP | 2000-157928 | 6/2000 |
| JP | 2000-169591 | 6/2000 |
| JP | 2001-106925 | 4/2001 |
| JP | 2002-121536 | 4/2002 |
| JP | 2002-327030 | 11/2002 |
| JP | 2003-055459 | 2/2003 |
| JP | 2003-226835 | 8/2003 |
| JP | 3817192 | 9/2003 |
| JP | 2004-292541 | 10/2004 |
| JP | 2005-014293 | 1/2005 |
| JP | 2006-160880 | 6/2006 |
| JP | 2006-335978 | 12/2006 |
| JP | 2007-090865 | 4/2007 |
| JP | 2007-146148 | 6/2007 |
| JP | 2007-146150 | 6/2007 |
| JP | 2008-056751 | 3/2008 |
| JP | 2008-115302 | 5/2008 |
| JP | 2008-127405 | 6/2008 |
| JP | 2008-144053 | 6/2008 |
| JP | 2008-201908 | 9/2008 |
| JP | 2008-303358 | 12/2008 |
| JP | 2009-009045 | 1/2009 |
| JP | 2009-024077 | 2/2009 |
| JP | 2009-029893 | 2/2009 |
| JP | 2009-051934 | 3/2009 |
| JP | 2009-091466 | 4/2009 |
| JP | 2009-155496 | 7/2009 |
| JP | 2009-191120 | 8/2009 |
| JP | 2009-253203 | 10/2009 |
| JP | 2009-280706 | 12/2009 |
| JP | 2010-005613 | 1/2010 |
| JP | 2010-095619 | 4/2010 |
| JP | 2010-116442 | 5/2010 |
| JP | 2010-128080 | 6/2010 |
| JP | 2010-144153 | 7/2010 |
| JP | 2010-175798 | 8/2010 |
| JP | 2010-229303 | 10/2010 |
| JP | 2010-260881 | 11/2010 |
| JP | 2010-265410 | 11/2010 |
| JP | 2010-275521 | 12/2010 |
| JP | 2011-063482 | 3/2011 |
| JP | 2011-081123 | 4/2011 |
| JP | 2011-099074 | 5/2011 |
| JP | 2011-115755 | 6/2011 |
| JP | 2011-132087 | 7/2011 |
| JP | 2012-036335 | 2/2012 |
| JP | 2012-036336 | 2/2012 |
| JP | 2012-144661 | 8/2012 |
| JP | 2013-010843 | 1/2013 |
| JP | 2013-022791 | 2/2013 |
| JP | 2013-076075 | 4/2013 |
| JP | 2013-249371 | 12/2013 |
| JP | 2013-251103 | 12/2013 |
| JP | 2014-005363 | 1/2014 |
| JP | 2014-007058 | 1/2014 |
| KR | 2006-0017891 | 2/2006 |
| KR | 2009-0067315 | 6/2009 |
| KR | 2010-0075235 | 7/2010 |
| KR | 2011-0038471 | 4/2011 |
| KR | 2012-0021926 | 3/2012 |
| KR | 2013-0026991 | 3/2013 |
| KR | 2013-0067401 | 6/2013 |
| WO | WO 1997-038054 | 10/1997 |
| WO | WO 2005-100426 | 10/2005 |
| WO | WO 2007-103654 | 9/2007 |
| WO | WO 2008-124080 | 10/2008 |
| WO | WO 2008-147072 | 12/2008 |
| WO | WO 2009-002660 | 12/2008 |
| WO | WO 2009-005880 | 1/2009 |
| WO | WO 2009-008452 | 1/2009 |
| WO | WO 2009-085926 | 7/2009 |
| WO | WO 2009-128441 | 10/2009 |
| WO | WO 2009-137197 | 11/2009 |
| WO | WO 2010-055632 | 5/2010 |
| WO | WO 2013-015469 | 1/2013 |
| WO | WO 2013-087365 | 6/2013 |
| WO | WO 2013-087366 | 6/2013 |
| WO | WO 2013-087368 | 6/2013 |
| WO | WO 2014-024379 | 2/2014 |
| WO | WO 2014-099699 | 6/2014 |
| WO | WO 2015-088932 | 6/2015 |
| WO | WO 2015-195355 | 12/2015 |
| WO | WO 2015-195391 | 12/2015 |

OTHER PUBLICATIONS

"Norrish Reaction" Wkipedia, [retrieved from the internet on Dec. 6, 2014], URL <http://en.wikipedia.org/wiki/Norrish_reaction>, pp. 4.

Boardman,"($\eta^5$ Cyclopentadienyl) trialkylplatinum Photohydrosilylation Catalyst. Mechanism of Active Catalyst Formation and Preparation of a Novel Bis(silyl)platimun Hydride", Organometallics, 1992, vol. 11, pp. 4194-4201.

Burget, "Kinetic study of the photoactivated hydrosilylation of some β-dicarbonyl complexes of trialkylplatinum (IV)", Journal of Photochemistry and Photobiology A: Chemistry,1996, vol. 97, pp. 163-170.

Ciba, Coating Effects Segment, 2001, 2 pgs.

Dow, Dow Corning Resin, Material Safety Data Sheet, 2013, 2 pgs.

Jakuczek, "Well-defined core-shell structures based on silsesquioxane microgels: Grafting of polystyrene via ATRP and product characterization", Polymer, 2008, vol. 49, pp. 843-856.

Lewis, "Platinum(II) Bis(β-Diketonates) as Photoactivated Hydrosilation Catalyst", 1995, vol. 34, pp. 3182-3189.

Su, "New Photocurable Acrylic/Silsesquioxane Hybrid Optical Materials: Synthesis, Properties, and Patterning", Macromolecular Materials and Engineering, 2007, vol. 292, pp. 666-673.

(56) References Cited

OTHER PUBLICATIONS

Wang, "Photoactivated hydrosilylation reaction of alkynes", Journal of Organometallic Chemistry, 2003, vol. 665, pp. 1-6.
International Search Report for PCT International Application No. PCT/US2015/050334, dated Nov. 27, 2015, 4 pages.

* cited by examiner

CURABLE POLYMERS COMPRISING SILSESQUIOXANE POLYMER CORE SILSESQUIOXANE POLYMER OUTER LAYER, AND REACTIVE GROUPS

CROSS REFERENCE TO RELATED APPLICATIONS

This application is a national stage filing under 35 U.S.C. 371 of PCT/US2015/050334, filed Sep. 16, 2015, which claims the benefit of U.S. Provisional Application No. 62/053,326, filed Sep. 22, 2014, the disclosure of which is incorporated by reference in its/their entirety herein.

SUMMARY

Curable silsesquioxane polymers are described comprising a core comprising a first silsesquioxane polymer and an outer layer comprising a second silsesquioxane polymer bonded to the core. The silsesquioxane polymer of the core, outer layer, or combination thereof comprises reactive groups. The curable silsesquioxane polymer is free of ethylenically unsaturated groups. The first silsesquioxane polymer of the core is bonded to the second silsesquioxane polymer of the outer layer via silicon atoms bonded to three oxygen atoms. In some embodiments, the outer layer has a higher concentration of reactive groups than the core. In this embodiment, the core may be substantially free of reactive groups. In other embodiments, the core has a higher concentration of reactive groups than the core. In this embodiment, the outer layer may be substantially free of reactive groups. The core and outer layer each comprise a three-dimensional branched network of a different silsesquioxane polymer. The silsesquioxane polymers of the core and outer layer may be homopolymers or copolymers.

Also described are methods of preparing curable silsesquioxane polymer comprising a core and outer layer bonded to the core, articles comprising curable or cured compositions comprising the silsesquioxane core/outer layer polymers, and methods of curing.

DETAILED DESCRIPTION OF EXEMPLARY EMBODIMENTS

Figure 1A:
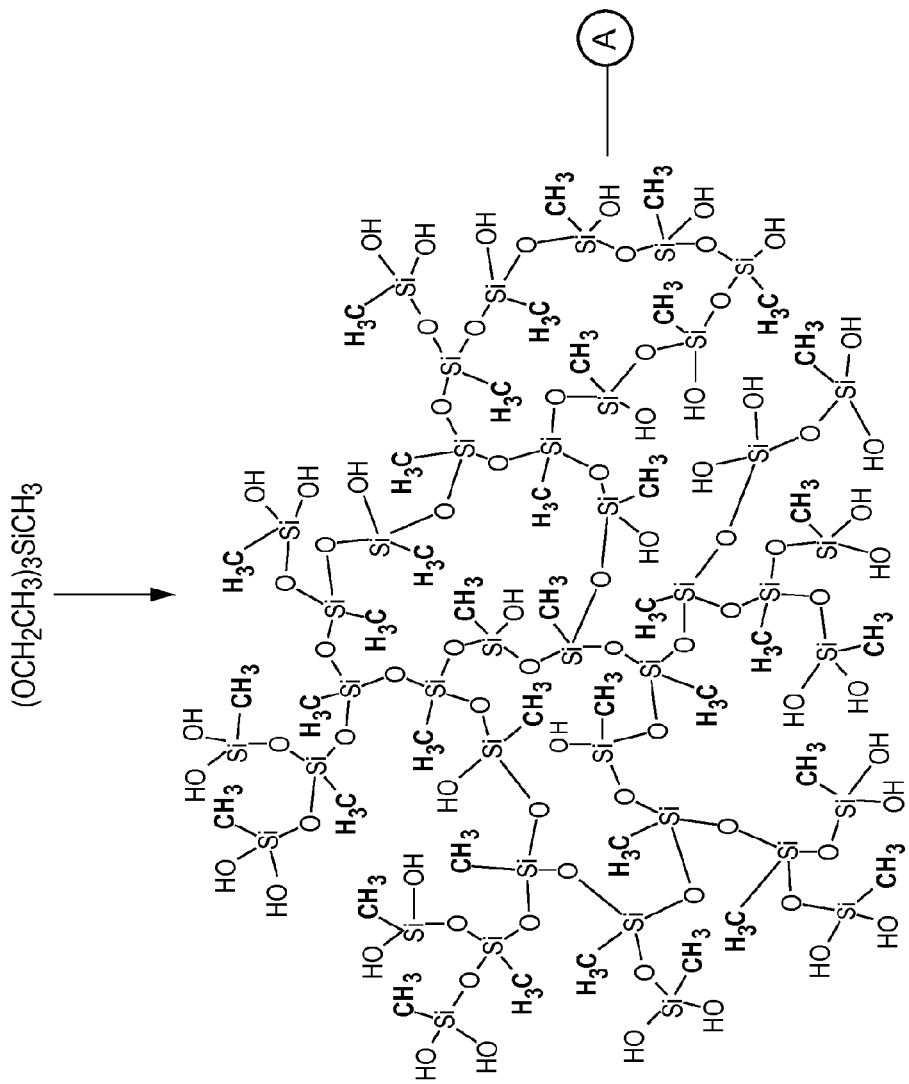
FIG. 1A is an illustrative schematic of a silsesquioxane polymer core.

As used herein, the term "organic group" means a hydrocarbon group (with optional elements other than carbon and hydrogen, such as oxygen, nitrogen, sulfur, silicon, and halogens) that is may be characterized as an aliphatic group, aromatic group, or combination thereof (e.g., alkaryl and aralkyl groups). In the context of the present invention, the organic groups are those that do not interfere with the formation of curable silsesquioxane polymer.

The term "aliphatic group" means a saturated or unsaturated linear, branched, or cyclic hydrocarbon group. This term is used to encompass alkyl, alkenyl, and alkynyl groups, for example. The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" are defined herein below. The term "heterocyclic group" means a closed ring hydrocarbon in which one or more of the atoms in the ring is an element other than carbon (e.g., nitrogen, oxygen, sulfur, etc.). The organic group can have any suitable valency but is often monovalent or divalent.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene"

refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the awl or arylene portion typically has from 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions (e.g. condensation). Typical hydrolyzable groups include, but are not limited to, alkoxy, aryloxy, aralkoxy, alkaryloxy, acyloxy, or halogen (directly boned to s silicon atom). As used herein, the term is often used in reference to one of more groups bonded to a silicon atom in a silyl group.

The term "alkoxy" refers to a monovalent group having an oxy group bonded directly to an alkyl group.

The term "aryloxy" refers to a monovalent group having an oxy group bonded directly to an aryl group.

The terms "aralkyloxy" and "alkaryloxy" refer to a monovalent group having an oxy group bonded directly to an aralkyl group or an alkaryl group, respectively.

The term "acyloxy" refers to a monovalent group of the formula —O(CO)$R^b$ where $R^b$ is alkyl, aryl, aralkyl, or alkaryl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl and alkaryl $R^b$ groups often have an alkyl group with 1 to 10 carbon atoms, 1 to 6 carbon atoms, or 1 to 4 carbon atoms and an aryl having 6 to 12 carbon atoms.

The term "halo" refers to a halogen atom such as fluoro, bromo, iodo, or chloro. When part of a reactive silyl, the halo group is often chloro.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

When a group is present more than once in a formula described herein, each group is "independently" selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

A silsesquioxane is an organosilicon compound with the empirical chemical formula R'SiO$_{3/2}$ where Si is the element silicon, O is oxygen and R' is either hydrogen or an aliphatic or aromatic organic group that optionally further comprise a reactive group. Thus, silsesquioxanes polymers comprise silicon atoms bonded to three oxygen atoms. Silsesquioxanes polymers that have a random branched structure are typically liquids at room temperature. Silsesquioxanes polymers that have a non-random structure like cubes, hexagonal prisms, octagonal prisms, decagonal prisms, and dodecagonal prisms are typically solids as room temperature.

Presently described are curable silsesquioxane polymers, comprising a plurality of reactive groups that are not ethylenically unsaturated groups. Thus, the reactive groups are not vinyl ($H_2C$=CH—) including vinyl ethers ($H_2C$=CHO—) and alkenyl ($H_2C$=CH($CH_2$)$_n$— wherein n typically ranges from 1 to 30 or 1 to 20 or 1 to 10. The reactive groups are also not (meth)acryl such as (meth) acrylamide ($H_2C$=CHCONH— and $H_2C$=CH($CH_3$) CONH—) and (meth)acrylate($CH_2$=CHCOO— and $CH_2$=C($CH_3$)COO—). The term "(meth)acrylate" includes both methacrylate and acrylate. Thus, as used herein, the term "reactive group" refers to a reactive group other than ethylenically unsaturated groups. Further, the "reactive group" is not a hydrolyzable group, such as Si—O($CH_3$). The reactive groups are capable of forming a covalent bond with the silsesquioxane polymer or functional group of at least one other monomer, oligomer, or polymer combined with the silsesquioxane polymer.

The presently described curable silsesquioxane polymers comprise a core comprising a first silsesquioxane polymer and an outer layer comprising a second silsesquioxane polymer bonded to the core. Such curable silsesquioxane polymers are referred to herein as "SSQ core/outer layer polymers". The second silsesquioxane polymer of the outer layer is typically bonded to the first silsesquioxane polymer of the core via silicon atoms bonded to three oxygen atoms. The silsesquioxane polymer of the core, outer layer, or combination thereof, comprises reactive groups. The first silsesquioxane polymer core is typically a different silsesquioxane polymer than the second silsesquioxane polymer outer layer. The first and second silsesquioxane polymer can be a homopolymer or copolymer. The curable silsesquioxane polymers may optionally further comprises additional layers bonded to the second silsesquioxane polymer outer layer, or in other words more than one outer layer.

Silsesquioxane polymers comprising a first silsesquioxane polymer core and a second silsesquioxane polymer outer layer can be made sequential hydrolysis and condensation of hydrolyzable silane reactants. At least one of the hydrolyzable silane reactants comprises a reactive group such as mercapto, epoxy, isocyanato, amine, cyano, and combinations thereof, having the formula V—Y—Si($R^1$)$_3$. In typical embodiments, at least one of the hydrolyzable silane reactants of the core or outer layer lacks a reactive group and lacks ethylenically unsaturated groups, having the formula U—Y—Si($R^1$)$_3$.

Figure 1B:
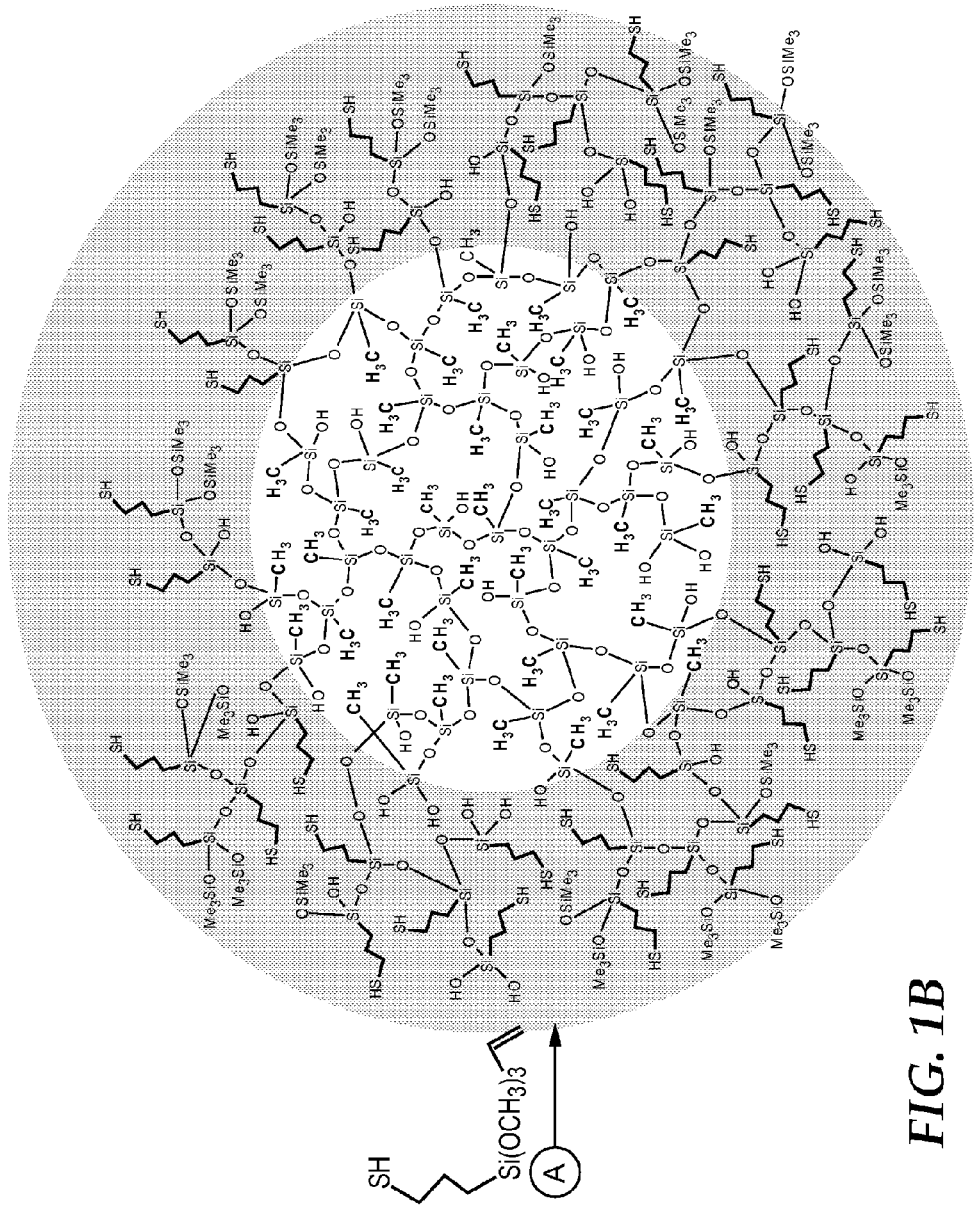
FIG. 1B is an illustrative schematic of a curable polymer comprising the silsesquioxane polymer core of FIG. 1A and a silsesquioxane polymer outer layer.

One embodied method of preparing a curable SSQ core/outer layer polymer comprises forming a first silsesquioxane polymer core by polymerizing one or more reactants comprising at least one reactant of the formula U—Y—Si($R^1$)$_3$; and forming an outer layer of a second silsesquioxane polymer on the first silsesquioxane polymer core by polymerizing the first silsesquioxane polymer with one or more reactants comprising at least one reactant formula V—Y—Si($R^1$)$_3$. For example, in one illustrative embodiment, the core is the reaction product of methyltrimethoxyl silane and the outer layer is the reaction product of mercaptopropyl-trimethoxysilane, as depicted in FIGS. 1A and 1B. In this embodiment, the first silsesquioxane polymer core is free of reactive groups and an outer layer comprises reactive groups.

An alternative embodied method of preparing a curable SSQ core/outer layer polymer comprises forming a first silsesquioxane polymer core by polymerizing one or more reactants comprising at least one reactant of the formula V—Y—Si($R^1$)$_3$; and forming an outer layer of a second silsesquioxane polymer on the first silsesquioxane polymer core by polymerizing the first silsesquioxane polymer with one or more reactants comprising at least one reactant formula U—Y—Si(R$^1$)$_3$. In this embodiment, the first silsesquioxane polymer core comprises reactive groups and the outer layer is free of reactive groups.

When the molar weight ratio of reactants utilized to prepare the first and second silsesquioxane polymer is about 1:1, the resulting SSQ core/outer layer polymer has about the same mass of first silsesquioxane polymer as second silsesquioxane polymer. The second silsesquioxane polymer outer layer may substantially surrounds the first silsesquioxane polymer core, such as depicted in FIG. 1. The molar weight ratio may be altered such that the mass of second silsesquioxane polymer outer layer is less than the mass of first silsesquioxane polymer core. As the mass of outer layer is reduced relative to the mass of the core, the second silsesquioxane polymer outer layer may only partially cover the surface of the first silsesquioxane polymer core. In yet another embodiment, the molar weight ratio may be altered such that the mass of second silsesquioxane polymer outer layer is greater than the mass of first silsesquioxane polymer core. Although FIGS. 1A and 1B depict the core and SSQ core/outer layer polymer having a spherical shape, the shape can vary.

In some embodiments of the reactant U—Y—Si(R$^1$)$_3$, Y is a covalent bond or a divalent organic linking group; and U is hydrogen, a (monovalent) organic group such as alkyl, aryl, aralkyl, or alkaryl that may optionally comprise halogen or other substituents provided that U is not a reactive group. U may optionally further comprise contiguous oxygen, nitrogen, sulfur, or silicon substituents, as well as combinations of such substituents. In some embodiments, U is an optionally halogenated (e.g. C$_1$-C$_{20}$) alkyl group such as (e.g. C$_4$-C$_6$) fluoroalkyl, a (e.g. C$_6$-C$_{12}$) aryl group such as phenyl, a (e.g. C$_6$-C$_{12}$)alk (e.g. C$_1$-C$_{20}$)aryl group, a (e.g. C$_6$-C$_{12}$)ar (e.g. C$_1$-C$_{20}$)alkyl group.

Examples of U—Y—Si(R$^1$)$_3$ reactants include for example aromatic trialkoxysilanes such as phenyltrimethoxylsilane, (C$_1$-C$_{12}$) alkyl trialkoxysilanes such as methyltrimethoxylsilane, fluoroalkyl trialkoxysilanes such as nonafluorohexyltriethoxysilane.

Other commercially available U—Y—Si(R$^1$)$_3$ reactants include for example trimethylsiloxytriethoxysilane; p-tolyl-triethoxysilane; tetrahydrofurfuryloxypropyltriethoxysilane; n-propyltriethoxysilane; (4-perfluorooctylphenyl)triethoxysilane; pentafluorophenyltriethoxysilane; nonafluorohexyl-triethoxysilane; 1-naphthyltriethoxysilane; 3,4-methylene-dioxyphenyltriethoxysilane; p-methoxyphenyltriethoxysilane; 3-isooctyltriethoxysilane; isobutyltriethoxysilane; (heptadecafluoro-1,1,2,2-tetrahydrodecyl)triethoxysilane; 3,5-dimethoxyphenyltriethoxysilane; 11-chloroundecyltriethoxysilane; 3-chloropropyltriethoxysilane; p-chlorophenyltriethoxysilane; chlorophenyltriethoxysilane; butylpoly(dimethylsiloxanyl) ethyltriethoxysilane; and benzyltriethoxysilane.

In some embodiments of the reactant V—Y—Si(R$^1$)$_3$, Y is a covalent bond or a divalent organic linking group; and V is a reactive group that is not an ethylenically unsaturated group or a hydrolyzable group. Examples of V—Y—Si(R$^1$)$_3$ reactants include for example epoxy silanes such as 3-glycidoxypropyltriethoxysilane; 5,6 epoxyhexyl-triethoxysilane; and 2-(3,4-epoxycyclohexyl)ethyltriethoxysilane; mercapto silanes such as mercaptopropyltriethoxysilane and s-(octanoyl)mercaptopropyltriethoxysilane; isocyanato silanes such as 3-isocyanatopropyltriethoxysilane; and cyano silanes such as 3-cyanopropyltriethoxysilane and 2-cyanoethyltriethoxysilane. Other examples of V—Y—Si(R$^1$)$_3$ reactants include 2-[(acetoxy(polyethyleneoxy)propyl]triethoxysilane and 2-(4-pyridylethyl)triethoxysilane.

In some embodiments, Y is a (e.g. C$_1$-C$_{20}$) alkylene group, a (e.g. C$_6$-C$_{12}$) arylene group, a (e.g. C$_6$-C$_{12}$)alk (e.g. C$_1$-C$_{20}$)arylene group, a (e.g. C$_6$-C$_{12}$)ar (e.g. C$_1$-C$_{20}$) alkylene group, or a combination thereof. Y may optionally further comprise (e.g. contiguous) oxygen, nitrogen, sulfur, silicon, or halogen substituents, or a combination thereof. In some embodiments, Y does not comprise oxygen or nitrogen substituents that can be less thermally stable.

The reactant U—Y—Si(R$^1$)$_3$ and/or V—Y—Si(R$^1$)$_3$ comprises three R$^1$ groups. In order to form a silsesquioxane polymer at least two of the R$^1$ groups are independently a hydrolyzable group. In typical embodiments, based on commercially available reactants, each R$^1$ group is independently a hydrolyzable group. In some embodiments of R$^1$, the hydrolyzable group is selected from alkoxy, aryloxy, aralkoxy, alkaryloxy, acyloxy, and halo. In some embodiments, R$^1$ is an alkoxy group. During hydrolysis, the hydrolyzable groups are converted to a hydrolyzed group, such as —OH. The Si—OH groups react with each other to form silicone-oxygen linkages such that the majority of silicon atoms are bonded to three oxygen atoms.

Although sequential polymerizing (of the same reactants) could also be utilized to produce a random silsesquioxane copolymer that is substantially the same as a random silsesquioxane copolymer that can be produce by (concurrent) copolymerization of reactants, in typical embodiments the reactants are chosen such that the first silsesquioxane polymer of the core is different than the second silsesquioxane polymer of the outer layer. In some embodiments, the first and second silsesquioxane polymers differ in the number of polymerized units comprising pendent reactive groups. In some, embodiments the outer layer has a higher concentration of reactive groups than the core. In other embodiments, the core has a higher concentration of reactive groups than the outer layer. In yet other embodiments, the first and second silsesquioxane polymers may differ in the number and type of polymerized units lacking reactive groups.

In some embodiments, the curable silsesquioxane polymer utilizes a single reactant U—Y—Si(R$^1$)$_3$ in the preparation of the first silsesquioxane polymer core and a single V—Y—Si(R$^1$)$_3$ in the preparation of the second silsesquioxane polymer outer layer. Thus, the core may comprise a homopolymer lacking reactive groups; whereas the outer layer may comprise a homopolymer comprising reactive groups.

In other embodiments, a single reactant V—Y—Si(R$^1$)$_3$ is utilized in the preparation of the first silsesquioxane polymer core and a single U—Y—Si(R$^1$)$_3$ in the preparation of the second silsesquioxane polymer outer layer. Thus, the core may comprise a homopolymer comprising reactive groups; whereas the outer layer may comprise a homopolymer lacking reactive groups.

In yet other embodiments, the core, outer layer, or a combination thereof may each comprise a silsesquioxane copolymer. For example, the core may be a silsesquioxane homopolymer; whereas the outer layer may be a silsesquioxane copolymer. Alternatively, the core may be a silsesquioxane copolymer; whereas the outer layer may be a silsesquioxane homopolymer. Further, both, the core and outer layer may both be different silsesquioxane copolymers.

Copolymers can be prepared from at least two U—Y—Si(R¹)₃ reactants. For example methyltriethoxysilane can be co-reacted with phenyltrimethoxysilane. The silsesquioxane polymers may comprise at least two different U groups (e.g. U' and U"), yet the same Y groups. Alternatively, the silsesquioxane polymers may comprise at least two different Y groups (e.g. Y' and Y"), yet the same U group. Further, the silsesquioxane polymers may comprise at least two reactants wherein both Y and X are different from each other. In such embodiment, R10 of the silsesquioxane polymer formula is independently an organic group lacking a reactive group and lacking an ethylenically unsaturated group. Further, m represents the total number of repeat units independently lacking reactive and ethylenically unsaturated groups.

Copolymers can also be prepared from at least two V—Y—Si(R¹)₃ reactants. For example, glycidoxypropyltriethoxysilane can be co-reacted with mercaptopropyltrimethoxysilane. In this embodiment, the silsesquioxane polymers may comprise at least two different V groups (e.g. V' and V"), yet the same Y groups. Alternatively, the silsesquioxane polymers may comprise at least two different Y groups (e.g. Y' and Y"), yet the same V group. Further, the silsesquioxane polymers may comprise at least two reactants wherein both Y and V are different from each other. In such embodiment, R11 of the curable silsesquioxane polymer formulas is independently an organic group comprising a reactive group. Further, n represents the total number of repeat units independently comprising a reactive group.

Copolymers can also be prepared from at least one U—Y—Si(R¹)₃ reactant and at least one U—Y—Si(R¹)₃. For example, an aliphatic alkoxy silane can be coreacted with an aromatic alkoxy silane. The inclusion of a silsesquioxane reactant or polymerized units having an R10 group that is not a reactive group or ethylenically unsaturated group can be used to enhance certain properties depending on the selection of the R10 group. For example, when R10 comprises an aromatic group such as phenyl, the thermal stability can be improved (relative to a homopolymer of methyltrimethoxysilane). Further, when R10 comprises a fluoroalkyl group, the hydrophobicity can be improved.

In some embodiments, the silsesquioxane polymer of the core or outer layer can be characterized as a three-dimensional branched network having the formula:

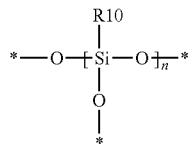

wherein R10 is an organic group that lacks a reactive group and lacks an ethylenically unsaturated group and the oxygen atom at the * is bonded to another Si atom within the three-dimensional branched network. In some embodiments of the curable silsesquioxane polymer, R10 has the formula Y—U, as derived from the reactant U—Y—Si(R¹)₃. Thus, Y is the depicted covalent bond or a divalent organic linking group as previously described. Further, U is the same a previously described. The number of polymerized units, m, is at least 2, 3, 4, 5, 6, 7, 8, 9, or 10. In some embodiments, m is at least 15, 20, 25, 30, 35, 40, 45, or 50. In some embodiments, m is no greater than 500, 450, 400, 350, 300, 250 or 200.

In other embodiments, the silsesquioxane polymer of the core or outer layer can be characterized as a three-dimensional branched network having the formula:

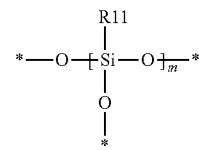

wherein R11 is an organic group comprising a reactive group and the oxygen atom at the * is bonded to another Si atom within the three-dimensional branched network. In some embodiments of the curable silsesquioxane polymer, R11 has the formula Y—V, as derived from the reactant V—Y—Si(R¹)₃. Thus, Y is the depicted covalent bond or a divalent organic linking group as previously described. Further, V is the same a previously described. The number of polymerized units, n, is at least 2, 3, 4, 5, 6, 7, 8, 9, or 10. In some embodiments, n is at least 15, 20, 25, 30, 35, 40, 45, or 50. In some embodiments, n is no greater than 500, 450, 400, 350, 300, 250 or 200.

In yet other embodiments, the silsesquioxane polymer of the core or outer layer can be characterized as a three-dimensional branched network having the formula:

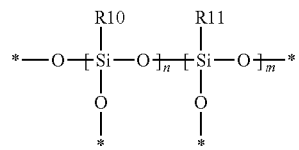

wherein R10 and R11 are organic groups as previously described, the oxygen atom at the * is bonded to another Si atom within the three-dimensional branched network, and n is at least 2 and m is at least 1.

After hydrolysis, remaining hydrolyzed (e.g. —OH) groups are preferably further reacted with end-capping agents to convert the hydrolyzed (e.g. —OH) groups to —OSi(R³)₃. Although not depicted in FIG. 1B, remaining hydrolyzed (e.g. —OH) groups of the first silsesquioxane polymer core can also be further reacted with end-capping agents to convert the hydrolyzed (e.g. —OH) groups to —OSi(R³)₃. The silsesquioxane polymer comprises terminal groups having the formula —Si(R³)₃ after end-capping.

Due to the end-capping, the curable SSQ core/outer polymer can comprise little or no —OH groups. In some embodiments, the —OH groups are present in an amount of no greater than 5, 4, 3, 2, 1 or 0.5 wt-% of the curable SSQ core/outer polymer. In some embodiments, the curable SSQ core/outer polymer is free of —OH groups. Various alkoxy silane end-capping agents are known. In some embodiments, the end-capping agent has the general structure R⁵OSi(R³)₃ or O[Si(R³)₃]₂ wherein R⁵ is a hydrolyzable group, as previously described and R³ is independently a non-hydrolyzable group. Thus, in some embodiments R³ generally lacks an oxygen atom or a halogen directly bonded to a silicon atom. $R^3$ is independently alkyl, aryl (e.g. phenyl), aralkyl, or alkaryl that optionally comprise halogen substituents (e.g. chloro, bromo, fluoro). The optionally substituted alkyl group may have a straight, branched, or cyclic structure. In some embodiments, $R^3$ is a $C_1$-$C_{12}$ or $C_1$-$C_4$ alkyl optionally comprising halogen substituents. $R^3$ may optionally comprise (e.g. contiguous) oxygen, nitrogen, sulfur, or silicon substituents. In some embodiments, $R^3$ does not comprise oxygen or nitrogen substituents that can be less thermally stable.

A non-limiting list of illustrative end-capping agents and the resulting $R^3$ groups is as follows:

| End-capping agent | $R^3$ |
|---|---|
| n-butyldimethylmethoxysilane | n-butyldimethyl |
| t-butyldiphenylmethoxysilane | t-butyldiphenyl |
| 3-chloroisobutyldimethylmethoxysilane | 3-chloroisobutyldimethyl |
| phenyldimethylethoxysilane | phenyldimethyl |
| n-propyldimethylmethoxysilane | n-propyldimethyl |
| triethylethoxysilane | triethyl |
| trimethylmethoxysilane | trimethyl |
| triphenylethoxysilane | triphenyl |
| n-octyldimethylmethoxysilane | n-octyldimethyl |
| hexamethyldisiloxane | trimethyl |
| hexaethyldisiloxane | triethyl |
| 1,1,1,3,3,3-hexaphenyldisiloxane | triphenyl |
| 1,1,1,3,3,3-hexakis(4-(dimethylamino)phenyl)disiloxane | tri-[4-(dimethylamino)phenyl] |
| 1,1,1,3,3,3-hexakis(3-fluorobenzyl)disiloxane | tri-(3-fluorobenzyl) |

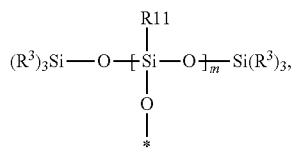

wherein m is at least 2;

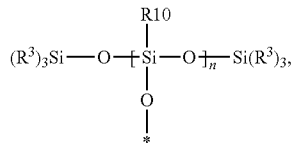

wherein n is at least 2;

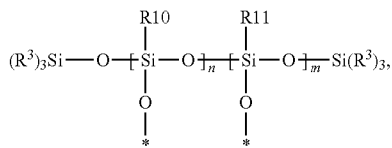

wherein n is at least 2 and m is at least 1;
wherein the oxygen atom at the * is bonded to another Si atom within the three-dimensional branched network, and R10 and R11 are the same as previously described.

In one naming convention, the $R^3$ group derived from the end-capping agent is included in the name of the polymer. For example poly(mercaptopropylsilsesquioxane) end-capped with ethoxytrimethylsilane may be named "trimethyl silyl poly(mercaptopropylsilsesquioxane)" and has the general formula:

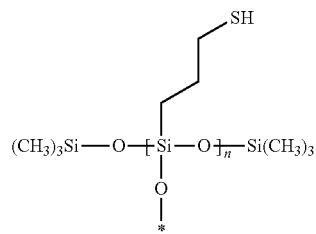

wherein the oxygen atom in the formula above at the * above is bonded to another Si atom within the three-dimensional branched network.

Various end-capped curable silsesquioxane polymers (i.e. homopolymers and copolymers) suitable for use as the core and/or outer layer are described in WO2015/088932; incorporated herein by reference.

The SSQ core/outer layer polymer (i.e. including both the core and outer layer) comprises at least two reactive groups (as previously defined). Thus, n is at least 2, 3, 4, 5, 6, 7, 8, 9, or 10. In the case of copolymers comprising n and m units, m is at least 1, 2, 3, 4, 5, 6, 7, 8, 9, or 10. In some embodiments, n, m, or n+m is at least 15, 20, 25, 30, 35, 40, 45, or 50. In some embodiments, n or m is no greater than 500, 450, 400, 350, 300, 250 or 200. Thus, n+m can range up to 1000.

When the silsesquioxane polymer of the core or outer layer is prepared from one or more reactants wherein all the reactants comprise a reactive group, 100 mole % of the repeat units comprise a reactive group. In some embodiments, n and m of the core, outer layer, or SSQ core/outer layer polymer are selected such the polymer comprises at least 25, 30, 35, 40, 45, 50 mol % of repeat units comprising reactive group(s) R11. In some embodiments, n and m are selected such the core, outer layer, or SSQ core/outer layer polymer comprises at least 50, 55, 60, 65, 70, 75 mol % of repeat units comprising reactive group(s) R11. In some embodiments, n and m are selected such the core, outer layer, or SSQ core/outer layer polymer comprises no greater than 95, 90, 85, 80 mol % of repeat units comprising reactive group(s) R11.

The some embodiments, the SSQ core/outer layer polymers described herein comprising reactive groups can be utilized to crosslink other monomers, oligomers, and/or polymers. The SSQ core/outer layer polymers can be lower cost as compared to a homopolymer prepared from 100% of (e.g. mercapto) reactants. Surprisingly, the SSQ core/outer layer polymers can have substantially less (e.g. mercapto) reactive groups, yet provide comparable cure performance.

The SSQ core/outer layer polymers described herein comprising mercapto functional groups crosslink other ethylenically unsaturated monomers, oligomers, and/or polymers. The thiol-ene "click" reaction involves the addition of a mercapto-group i.e. S—H bond across a double or triple bonds by either a free radical or ionic mechanism. The thiol-ene "click" reaction occurs in the absence of photoinitiator and is not inhibited by the presence of oxygen. One representative reaction is depicted as follows:

Thiol-ene "Click" Reaction

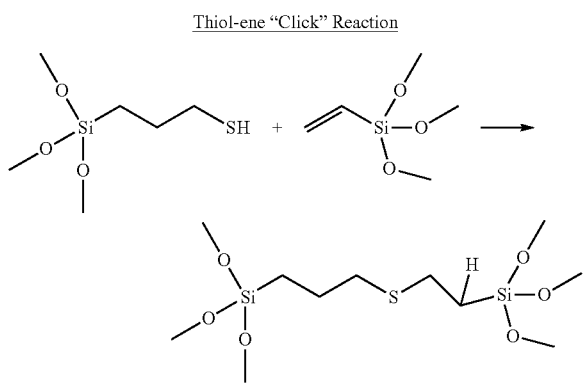

A wide variety of ethylenically unsaturated monomers, oligomers, and/or polymers can be crosslinked utilizing the thiol-ene "click" reaction. In typical embodiments, such monomers, oligomers, and/or polymers comprise at least two vinyl or (meth)acrylate terminal groups.

In some embodiments, the SSQ core/outer layer polymers described herein comprising mercapto functional groups can be utilized to crosslink silane monomers containing more than one ethylenically unsaturated moieties such as tetravinyl silane, divinyldimethylsilane, and the like.

In other embodiments, the SSQ core/outer layer polymers described herein comprising mercapto functional groups can be utilized to crosslink vinyl or (meth)acrylate terminated siloxanes. The chemical formula for vinyl or (meth)acrylate terminated polydimethylsiloxane (PDMS) is R-L-[Si(CH$_3$)$_2$O]$_n$Si(CH$_3$)$_2$-L-R, where n is the number of repeating monomer [SiO(CH$_3$)$_2$] units, L is a divalent (e.g. C$_1$-C$_4$ alkylene) linking group and R is vinyl or (meth)acrylate. The molecular weight (Mw) of such vinyl or (meth)acrylate terminated siloxanes can range from about 200 to about 200,000 g/mole. In some embodiments, the molecular weight is no greater than about 50,000 or 25,000 g/mole. In some embodiments, the molecular weight is no greater than about 20,000; 15,000; 10,000 or 5,000 g/mole.

In other embodiments, the ethylenically unsaturated monomers, oligomers, and/or polymers are hydrophilic, such as in the case of vinyl or (meth)acrylate terminated poly(ethylene) glycols or poly(ethylene)oxides. In some embodiments, the molecular weight (Mn) of such poly(ethylene) glycols or poly(ethylene)oxides ranges from about 100 to 10,000; 5,000, or 1,000 g/mole.

In yet other embodiments, a SSQ core/outer layer crosslinking polymer can be utilized to crosslink a (e.g. low Tg) (meth)acrylic polymer or as a crosslinker in a pressure sensitive adhesive, such as described in U.S. Provisional Application No. 62/014,847, filed Jun. 20, 2014 and U.S. Provisional Application No. 62/014,802, filed Jun. 20, 2014; incorporated herein by reference. In these embodiments, the (meth)acrylic polymer and/or pressure sensitive adhesive typically comprises polymerized units derived from one or more (meth)acrylate ester monomers derived from a (e.g. non-tertiary) alcohol containing from 1 to 14 carbon atoms and preferably an average of from 4 to 12 carbon atoms. The (meth)acrylic polymer and/or pressure sensitive adhesive composition may also comprise polymerized units derived from one or more monomers (e.g. common to acrylic polymers and adhesives) such as a (meth)acrylic ester monomers (also referred to as (meth)acrylate acid ester monomers and alkyl(meth)acrylate monomers) optionally in combination with one or more other monomers such as acid-functional ethylenically unsaturated monomers, non-acid-functional polar monomers, and vinyl monomers.

The SSQ core/outer layer polymers described herein comprising epoxy or glycidoxy functional groups self crosslink either via ring-opening polymerization of epoxy rings in the presence of acid catalysts or can crosslink amine containing monomers or polymers. Epoxy containing SSQ core/outer layer polymers can be utilized to make functional hard coatings or films. The SSQ core/outer layer polymers containing isocyano (—CNO) functional groups can be cured by reacting with hydroxyl (—OH) functional monomers or polymers yielding hard functional urethane linkages containing coatings or films.

The concentration of SSQ core/outer layer crosslinking polymer is typically at least 0.1, 0.2, 0.3, 0.4 or 0.5 wt-% and can range up to 15 or 20 wt-% of the composition. In typical embodiments, the concentration of the SSQ crosslinking polymer is no greater than 10, 9, 8, 7, 6, or 5 wt-% and in some favored embodiments, no greater than 4, 3, 2, or 1 wt-%.

The SSQ core/outer layer crosslinking polymer can also be combined with various ethylenically unsaturated monomers, oligomers, and/or polymers, such as previously described, to form inorganic-organic hybrid networks. In this embodiment, the concentration of SSQ polymer is typically at least 10, 15 or 20 wt-%. In typical embodiments, the concentration of the SSQ crosslinking polymer is no greater than 90, 85 or 80 wt-%.

The various compositions described herein may comprise a single core/outer layer SSQ polymer or a combination of two or more of such core/outer layer SSQ polymers. When the composition comprises a combination of polymers, the total concentration of SSQ core/outer layer polymer generally falls within the ranges just described.

In favored embodiments, the SSQ core/outer layer polymer can be used to crosslink other ethylenically unsaturated monomers by exposing the composition to actinic radiation in the absence of a photoinitiator. In other embodiments, the curable SSQ core/outer layer polymers can be combined with a photoinitiator and UV cured. In either embodiment, curing occurs for a time effective to render the coating sufficiently non-tacky to the touch.

If a photoinitiator is present, the photoinitiator is typically present in a coating composition in an amount of at least 0.01 percent by weight (wt-%), based on the total weight of curable material in the coating composition. A photoinitiator is typically present in a coating composition in an amount of no greater than 10 wt-%, based on the total weight of curable material in the coating composition.

Suitable photoinitiators include a variety of free-radical photoinitiators. Free-radical generating photoinitiators include Norrish Type I type reactions, which are commonly referred to as alpha cleavage type initiators. The Norrish Type I reactions can be characterized as the photochemical cleavage of aldehydes and ketones. Various aryl ketone and aryl aldehyde groups that are capable of Norrish Type I type cleavage are known, some of which are described in U.S. Pat. No. 5,506,279 (Gaddam et al.). Free-radical generating photoinitiators can also be Norrish Type II type reactions, which are commonly referred to as hydrogen abstraction type initiators. Various groups that are capable of Norrish Type II cleavage are also known, some of which are described in U.S. Pat. No. 5,773,485 (Gaddam et al.).

Exemplary free-radical photoinitiators include substituted acetophenones such as 2,2-dimethoxy-2-phenylacetophenone photoinitiator, available the trade name IRGACURE 651 or ESACURE KB-1 photoinitiator (Sartomer Co., West Chester, Pa.); benzophenone, 4-methylbenzophenone, benzoyl benzoate, phenylacetophenones, 2,2-dimethoxy-2-phenylacetophenone, alpha,alpha-diethoxyacetophenone, 1-hydroxy-cyclohexyl-phenyl-ketone (available under the trade designation IRGACURE 184 from BASF Corp., Florham Park, N.J.), 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), 2,4,6-trimethylbenzoyl-diphenylphosphine oxide, and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

The compositions described herein can comprise nanoparticles that can impart hardness to a coating. Suitable nanoparticles of the present disclosure include an inorganic oxide. Exemplary nanoparticle can include an oxide of a non-metal, an oxide of a metal, or combinations thereof. An oxide of a non-metal includes an oxide of, for example, silicon or germanium. An oxide of a metal includes an oxide of, for example, iron, titanium, cerium, aluminum, zirconium, vanadium, zinc, antimony, and tin. A combination of a metal and non-metal oxide includes an oxide of aluminum and silicon.

The nanoparticle can have an average particle size of no greater than 100 nanometers (nm), no greater than 75 nanometers, no greater than 50 nanometers, no greater than 25 nanometers, no greater than 20 nanometers, no greater than 15 nanometers, or no greater than 10 nanometers. The nanoparticle can have an average particle size of at least 1 nanometer, at least 5 nanometers, at least 15 nanometers, at least 20 nanometers, at least 25 nanometers, at least 50 nanometers, or at least 75 nanometers.

Various nanoparticles are commercially available. Commercial sources of nanoparticles are available from Nyacol Co., Ashland, Mass., Solvay-Rhodia (Lyon, France), and Nalco Co., Naperville, Ill. Nanoparticles can also be made using techniques known in the art. For example, zirconia nanoparticles can be prepared using hydrothermal technology, as described for example in PCT Publication No. WO2009/085926 (Kolb et al.). Suitable zirconia nanoparticles are also those described in, for example, U.S. Pat. No. 7,241,437 (Davidson, et al.).

In some embodiments, the nanoparticles may be in the form of a colloidal dispersion. Colloidal silica nanoparticles in a polar solvent are particularly desirable. Silica sols in a polar solvent such as isopropanol are available commercially under the trade names ORGANOSILICASOL IPA-ST-ZL, ORGANOSILICASOL IPA-ST-L, and ORGANOSILICASOL IPA-ST from Nissan Chemical Industries, Ltd., Chiyoda-Ku Tokyo, Japan.

Preferably, the nanoparticles are dispersed in a curable coating composition of the present disclosure. If used, nanoparticles are typically present in a curable coating composition in an amount of at least 5 wt-%, based on the total weight of the composition. If used, nanoparticles are typically present in a curable coating composition in an amount of no greater than 80 wt-%, or no greater than 50 wt-%, based on the total weight of the composition. Depending on the particle size of the nanoparticles and the amount of nanoparticles added, some compositions may be hazy. For example, a composition that includes over 50 wt-% of 10 nanometer nanoparticles may be hazy, but such composition can be useful for some applications.

A coating composition that includes a curable SSQ core/outer layer polymer, a photoinitiator, and optional nanoparticles, can also include an optional organic solvent, if desired. Useful solvents for the coating compositions include those in which the compound is soluble at the level desired. Typically, such organic solvent is an organic solvent. Exemplary useful organic solvents include, but are not limited to, ethanol, isopropanol, methyl ethyl ketone, methyl isobutyl ketone, dimethylformamide, and tetrahydrofuran, heptanes, hexanes, octanes, toluene. These solvents can be used alone or as mixtures thereof.

Any amount of the optional organic solvent can be used. For example, the curable coating compositions can include up to 50 wt-% or even more of organic solvent. The solvent can be added to provide the desired viscosity to the coating composition. In some embodiments, no solvent or only low levels (e.g., up to 10 wt-%) of organic solvent is used in the curable coating composition.

The coating composition is typically a homogeneous mixture (e.g., of just the curable SSQ core/outer layer polymer and photoinitiator) that has a viscosity appropriate to the application conditions and method. For example, a material to be brush or roller coated would likely be preferred to have a higher viscosity than a dip coating composition. Typically, a coating composition includes at least 5 wt-%, of the SSQ core/outer layer polymer, based on the total weight of the coating composition. A coating composition often includes no greater than 80 wt-%, of the SSQ core/outer layer polymer, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

The curable coating composition described herein can be applied in a continuous or patterned layer. Such layer can be disposed on at least a portion of at least one surface of the substrate. If the curable composition includes an organic solvent, the coated curable composition can be exposed to conditions that allow the organic solvent to evaporate from the curable composition before UV curing the curable composition. Such conditions include, for example, exposing the composition to room temperature, or an elevated temperature (e.g., 60° C. to 70° C.).

The substrate on which the coating can be disposed can be any of a wide variety of hard or flexible materials. Useful substrates include ceramics, siliceous substrates including glass, metal, natural and man-made stone, and polymeric materials, including thermoplastics and thermosets. Suitable materials include, for example, poly(meth)acrylates, polycarbonates, polystyrenes, styrene copolymers such as styrene acrylonitrile copolymers, polyesters, polyethylene terephthalate.

The compositions described herein are suitable for preparing protective coatings such as weatherable silsesquioxane glass coating or hard coating for various end uses and articles. For example, such coatings can be used as anti-scratch and anti-abrasion coatings for various polycarbonate lens and polyesters films, which require additional properties such as optical clarity, durability, hydrophobicity, etc., or any other application where use of temperature, radiation, or moisture may cause degradation of films.

EXAMPLES

Unless otherwise noted, all parts, percentages, ratios, etc., in the examples and in the remainder of the specification are by weight. Unless otherwise noted, all chemicals were obtained or were available from chemical suppliers such as Sigma-Aldrich Chemical Company, St. Louis, Mo.

TABLE 1

Materials

| Designation | Description | Supplier |
|---|---|---|
| Monomer-1 | Methyltrimethoxysilane | Gelest, Inc., Morrisville, PA |
| Monomer-2 | Phenytrimethoxysilane | |
| Monomer-3 | Glycidoxypropyltriethoxysilane | |
| MPTS | Mercaptopropyltrimethoxysilane | |
| | 1,5-Divinylhexamethyltrisiloxane | |
| | Ethoxytrimethylsilane | |
| TVS | Tetravinylsilane | |
| | 1,3,5-Trivinylpentamethyltrisiloxane | |
| "DMS-V03" | Vinyl terminated polydimethylsiloxane, available under the trade designation "DMS-V03", 500 molecular weight | |
| "IRGACURE 184" | 1-Hydroxy-cyclohexyl-phenylketone, available under the trade designation "IRGACURE 184" | BASF Corp., Florham Park, NJ |
| IPA | Isopropyl alcohol | Sigma-Aldrich Chemical Company, St. Louis, MO |
| MEK | Methyl ethyl ketone | |
| TTA | Tartaric acid (2,3-dihydroxybutanedioic acid) | |
| PEG-MA | Poly(ethylene glycol) methacrylate (average $M_n$ 500) | |
| PEG-DVE | Poly(ethylene glycol) divinyl ether (average $M_n$ 250) | |
| "DMS-R11" | A methacryloxypropyl terminated polydimethylsiloxane, available under the trade designation "DMS-R11", 900-1200 molecular weight | |
| "3SAB PET" | 2-mil (~58 micrometers) thick polyester terephthalate (PET) film, which has one side chemically treated or primed to improve the adhesion of silicone coatings, commercially available under the trade designation "HOSTAPHAN 3SAB" | Mitsubishi Polyester Film, Greer, SC |

Example 1A: Preparation of a "Core-Outer Layer" MP-SSQ Polymer Comprising Mercapto Functional Groups Methyltrimethoxysilane ("Monomer-1", 100 g), deionized water (80 g), and tartaric acid (0.25 g) were mixed together at room temperature in a 500 mL round bottom flask equipped with a condenser. The mixture was stirred at 70° C. for 1 hour, followed by the addition of mercaptopropyltrimethoxysilane ("MPTS", 10 g) and subsequent stirring for 1 hour, followed by the addition of ethoxytrimethylsilane (20 g). The resulting mixture was stirred at 70° C. for another 1 hour, followed by evaporation of the solvents (water/ethanol mixture) under reduced pressure. The resulting viscous liquid was dissolved in methyl ethyl ketone (100 mL) and washed three-times with deionized water (100 mL). The methyl ethyl ketone was then evaporated under reduced pressure to yield a silsesquioxane polymer as a viscous liquid having a poly(methyltrimethoxysilane) core and poly(mercaptopropyltrimethoxysilane) outer layer.

The core-shell polymers of Examples 1B, 2A, 2B, 3A, and 3B (i.e., MP-SSQ-B to MP-SSQ-F) were also prepared from their respective monomers, as listed in Table 2, using the aforementioned method.

TABLE 2

| Example | Core monomer, grams | Outer Layer MPTS, grams | Water, grams | TTA, grams | MP-SSQ designation |
|---|---|---|---|---|---|
| EX-1A | Monomer-1, 100 | 10 | 80 | 0.25 | MP-SSQ-A |
| EX-1B | Monomer-1, 100 | 100 | 160 | 0.35 | MP-SSQ-B |
| EX-2A | Monomer-2, 100 | 10 | 80 | 0.25 | MP-SSQ-C |
| EX-2B | Monomer-2, 100 | 100 | 160 | 0.35 | MP-SSQ-D |
| EX-3A | Monomer-3, 50 | 5 | 40 | 0.15 | MP-SSQ-E |
| EX-3B | Monomer-3, 50 | 50 | 80 | 0.25 | MP-SSQ-F |

Example 4A: Preparation of a "Core-Outer Layer" GP-SSQ Polymer Comprising Epoxy Functional Groups Methyltrimethoxysilane (100 g), deionized water (80 g), and tartaric acid (0.25 g) were mixed together at room temperature in a 500 mL round bottom flask equipped with a condenser. The mixture was stirred at 70° C. for 1 hour, followed by the addition of glycidoxypropyltriethoxysilane ("Monomer-3", 20 g) and subsequent stirring for 1 hour, followed by the addition of ethoxytrimethylsilane (20 g). The resulting mixture was stirred at 70° C. for another 1 hour, followed by evaporation of the solvents (water/ethanol mixture) under reduced pressure. The resulting viscous liquid was dissolved in methyl ethyl ketone (100 mL) and washed three-times with deionized water (100 mL). The methyl ethyl ketone was then evaporated under reduced pressure to yield a silsesquioxane polymer as a viscous liquid having a poly(methyltrimethoxysilane) core and poly(glycidoxypropyltriethoxysilane) outer layer.

The core-shell polymers of Examples 4B, 5A, and 5B (i.e., GP-SSQ-B to GP-SSQ-D) were also prepared from their respective monomers, as listed in Table 3, using the aforementioned method.

TABLE 3

| Example | Core monomer, grams | Outer Layer Monomer-3, grams | Water, grams | TTA, grams | GP-SSQ designation |
|---|---|---|---|---|---|
| EX-4A | Monomer-1, 100 | 20 | 80 | 0.25 | GP-SSQ-A |
| EX-4B | Monomer-1, 100 | 100 | 160 | 0.35 | GP-SSQ-B |
| EX-5A | Monomer-2, 100 | 20 | 80 | 0.25 | GP-SSQ-C |
| EX-5B | Monomer-2, 100 | 100 | 160 | 0.35 | GP-SSQ-D |

Example 6: Preparation of a Curable Formulation and a Cured Film

A "Material-1" core-shell polymer (MP-SSQ-A, 25 grams, as in Table 3, Example 4) and a "Material-2" (PEG-MA, 25 grams, as in Table 3, Example 4) were dissolved in 100 g of IPA/MEK mixture (70:30 w/w), followed by the addition of IRGACURE 184 (0.3 g). Using a #8 Mayer Rod, the mixture was then coated on a 2-mil (~58 micrometers) thick 3SAB PET film. To cure, the coated film was passed through the "LIGHT HAMMER 6" UV-chamber (obtained from Fusion UV Systems, Inc. Gaithersburg, Md., under trade designation "Light Hammer 6") equipped with an H-bulb located at 5.3 cm above the coated surface, at 12 meters/minute. The coating was cured to touch.

The coatings of Examples 7 to 23 were also prepared and cured by mixing their respective "Material-1" and "Material-2", as summarized in Table 4, using the aforementioned method.

| Example | Material-1 (Amount in grams) | Material-2 (Amount in grams) |
|---|---|---|
| EX-6 | MP-SSQ-A (25 g) | PEG-MA (25 g) |
| EX-7 | MP-SSQ-B (5 g) | PEG-MA (25 g) |
| EX-8 | MP-SSQ-C (25 g) | PEG-DVE (25 g) |
| EX-9 | MP-SSQ-D (5 g) | PEG-MA (25 g) |
| EX-10 | MP-SSQ-E (25 g) | PEG-MA (25 g) |
| EX-11 | MP-SSQ-F (5 g) | PEG-MA (25 g) |
| EX-12 | MP-SSQ-A (25 g) | PEG-DVE (25 g) |
| EX-13 | MP-SSQ-A (15 g) | DMS-R11 (25 g) |
| EX-14 | MP-SSQ-B (5 g) | DMS-R11 (25 g) |
| EX-15 | MP-SSQ-A (20 g) | DMS-V03 (25 g) |
| EX-16 | MP-SSQ-B (10 g) | DMS-V03 (25 g) |
| EX-18 | MP-SSQ-A (5 g) | Tetravinylsilane (1 g) |
| EX-19 | MP-SSQ-B (5 g) | Tetravinylsilane (0.5 g) |
| EX-20 | MP-SSQ-A (5 g) | 1,3,5-Trivinylpentamethyltrisiloxane (2 g) |
| EX-21 | MP-SSQ-B (5 g) | 1,3,5-Trivinylpentamethyltrisiloxane (1 g) |
| EX-22 | MP-SSQ-A (5 g) | 1,5-Divinylhexamethyltrisiloxane (3 g) |
| EX-23 | MP-SSQ-B (5 g) | 1,5-Divinylhexamethyltrisiloxane (1 g) |

Example 24: Preparation of a "Core-Outer Layer" Polymer Comprising Epoxy Functional Groups Glycidoxypropyltriethoxysilane ("Monomer-3", 100 g), deionized water (80 g), and tartaric acid (0.25 g) were mixed together at room temperature in a 500 mL round bottom flask equipped with a condenser. The mixture was stirred at 70° C. for 1 hour, followed by the addition of methyltrimethoxysilane (40 g) (Monomer 1) and subsequent stirring for 1 hour, followed by the addition of ethoxytrimethylsilane (20 g). The resulting mixture was stirred at 70° C. for another 1 hour, followed by evaporation of the solvents (water/ethanol mixture) under reduced pressure. The resulting viscous liquid was dissolved in methyl ethyl ketone (100 mL) and washed three-times with deionized water (100 mL). The methyl ethyl ketone was then evaporated under reduced pressure to yield a silsesquioxane polymer having a poly (glycidoxypropyltriethoxysilane) core and poly(methyltrimethoxysilane) outer layer.

What is claimed is:

1. A curable silsesquioxane polymer comprising a core comprising a first silsesquioxane polymer and an outer layer comprising a second silsesquioxane polymer bonded to the core wherein the silsesquioxane polymer of the core, outer layer, or a combination thereof comprises reactive groups selected from mercapto, epoxy, isocyanato and combinations thereof; and the curable silsesquioxane polymer is free of ethylenically unsaturated groups and wherein the curable silsesquioxane polymer comprises terminal groups having the formula —Si(R$^3$)$_3$ wherein R$^3$ is a non-hydrolyzable group.

2. The curable silsesquioxane polymer of claim 1 the first silsesquioxane polymer of the core is bonded to the second silsesquioxane polymer of the outer layer via silicon atoms bonded to three oxygen atoms.

3. The curable silsesquioxane polymer of claim 1 wherein the outer layer comprises a three-dimensional branched network having the formula

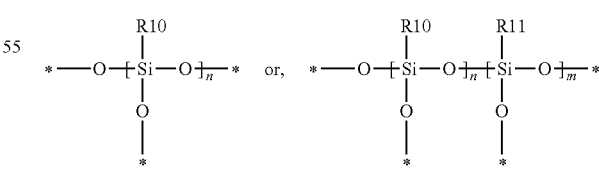

wherein
R10 is an organic group lacking a reactive group and lacking an ethylenically unsaturated group,
R11 is an organic group comprising a reactive group that is not an ethylenically unsaturated group or a hydrolyzable group, the oxygen atom at the * is bonded to another Si atom within a three-dimensional branched network, and
n is at least 2 and m is at least 1.

4. The curable silsesquioxane polymer of claim 1 wherein the core comprises a three-dimensional branched network having the formula

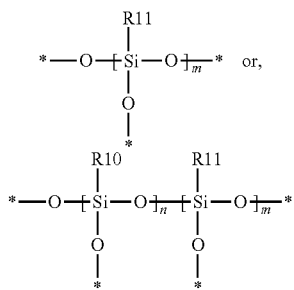

wherein
R11 is an organic group comprising a reactive group that is not an ethylenically unsaturated group or a hydrolyzable group,
R10 is an organic group lacking a reactive group inclusive of ethylenically unsaturated groups, the oxygen atom at the * is bonded to another Si atom within a three-dimensional branched network,
m or n+m is at least 2.

5. The curable silsesquioxane polymer of claim 4 wherein n and m are each no greater than about 500 g/mole.

6. The curable silsesquioxane polymer of claim 1 wherein the core has a higher concentration of reactive groups than the outer layer.

7. The curable silsesquioxane polymer of claim 6 wherein the outer layer is substantially free of reactive groups.

8. The curable silsesquioxane polymer of claim 1 wherein the outer layer has a higher concentration of reactive groups than the core.

9. The curable silsesquioxane polymer of claim 8 wherein the core is substantially free of reactive groups.

10. The curable silsesquioxane polymer of claim 1 wherein the curable silsesquioxane polymer further comprise —OH groups present in an amount of no greater than 5 wt-% of the silsesquioxane polymer.

11. The curable silsesquioxane polymer of claim 1 wherein the silsesquioxane polymer is free of —OH groups.

12. The curable silsesquioxane polymer of claim 1 wherein the reactive groups can be crosslinked via exposure to ultraviolet radiation.

13. An article comprising a substrate and the curable or cured composition of claim 1 disposed on at least a portion of a surface of a substrate.

14. A photocurable composition comprising at least one monomer, oligomer, or polymer comprising ethylenically unsaturated groups and a curable silsesquioxane polymer crosslinker of comprising a core comprising a first silsesquioxane polymer and an outer layer comprising a second silsesquioxane polymer bonded to the core wherein the silsesquioxane polymer of the core, outer layer, or a combination thereof comprises reactive groups and the curable silsesquioxane polymer is free of ethylenically unsaturated groups and wherein the curable silsesquioxane polymer comprises terminal groups having the formula —Si($R^3$)$_3$ wherein $R^3$ is a non-hydrolyzable group.

15. The photocurable composition of claim 14 wherein the ethylenically unsaturated groups of the monomer, oligomer, or polymer are (meth)acrylate, vinyl, or a combination thereof.

16. The photocurable composition of claim 14 wherein the monomer, oligomer, or polymer is a siloxane containing monomer, oligomer or polymer.

17. The photocurable composition of claim 14 wherein the composition is free of photoinitiator.

18. The photocurable composition of claim 14 wherein the reactive group is selected from mercapto, epoxy, isocyanato and combinations thereof.

19. A method of curing a silsesquioxane polymer comprising providing a curable silsesquioxane polymer comprising a core comprising a first silsesquioxane polymer and an outer layer comprising a second silsesquioxane polymer bonded to the core wherein the silsesquioxane polymer of the core, outer layer, or a combination thereof comprises reactive groups and the curable silsesquioxane polymer is free of ethylenically unsaturated groups and wherein the curable silsesquioxane polymer comprises terminal groups having the formula —Si($R^3$)$_3$ wherein $R^3$ is a non-hydrolyzable group; and
exposing the curable silsesquioxane polymer to actinic radiation.

20. The method of claim 19 wherein the actinic radiation is ultraviolet radiation.

21. The method of curing of claim 19 wherein the reactive group is selected from mercapto, epoxy, isocyanato and combinations thereof.

* * * * *

UNITED STATES PATENT AND TRADEMARK OFFICE
CERTIFICATE OF CORRECTION

PATENT NO. : 9,957,358 B2  
APPLICATION NO. : 15/508518  
DATED : May 1, 2018  
INVENTOR(S) : Jitendra Rathore Page 1 of 1

It is certified that error appears in the above-identified patent and that said Letters Patent is hereby corrected as shown below:

On the Title Page

<u>(Notice)</u>
Line 3, after "0 days." delete "days.".

<u>Page 3 Column 2 (Other Publications)</u>
Line 1, delete "Wkipedia," and insert -- Wikipedia, --, therefor.

In the Specification

<u>Column 3</u>
Line 7, delete "awl" and insert -- aryl --, therefor.

<u>Column 15</u>
Line 5, delete "Phenytrimethoxysilane" and insert -- Phenyltrimethoxysilane --, therefor.

In the Claims

<u>Column 20</u>
Line 9 (approx.), in Claim 14, after "crosslinker" delete "of".

Signed and Sealed this  
Eighteenth Day of September, 2018

Andrei Iancu  
*Director of the United States Patent and Trademark Office*